US007682057B2

(12) United States Patent
Albou

(10) Patent No.: US 7,682,057 B2
(45) Date of Patent: Mar. 23, 2010

(54) LIGHTING MODULE FOR A MOTOR VEHICLE AND A LIGHT COMPRISING SUCH A MODULE

(75) Inventor: Pierre Albou, Bobigny (FR)

(73) Assignee: Valeo Vision, Bobigny, Cedex (FR)

( * ) Notice: Subject to any disclaimer, the term of this patent is extended or adjusted under 35 U.S.C. 154(b) by 158 days.

(21) Appl. No.: 11/165,770

(22) Filed: Jun. 23, 2005

(65) Prior Publication Data

US 2006/0002130 A1 Jan. 5, 2006

(30) Foreign Application Priority Data

Jun. 24, 2004 (FR) .................................. 04 06946

(51) Int. Cl.
*B60Q 1/00* (2006.01)

(52) U.S. Cl. ....................... 362/507; 362/487; 362/509; 362/516; 362/517; 362/522; 362/538; 362/543; 362/546; 359/853; 359/860; 359/867

(58) Field of Classification Search ................. 362/268, 362/487, 507, 509, 516, 517, 522, 538, 543, 362/546, 800; 359/853, 860, 867
See application file for complete search history.

(56) References Cited

U.S. PATENT DOCUMENTS 1,722,368 A * 7/1929 Comstock ................... 430/321
4,517,630 A * 5/1985 Dieffenbach et al. ........ 362/509
6,644,841 B2 * 11/2003 Martineau ................... 362/545
7,134,775 B2 * 11/2006 Oishi et al. ................. 362/545
2002/0067548 A1 * 6/2002 TerHovhannisian ......... 359/627
2003/0169600 A1 * 9/2003 Amano ....................... 362/545
2003/0202359 A1 10/2003 Albou
2003/0214815 A1 * 11/2003 Ishida et al. ................ 362/516
2004/0120158 A1 6/2004 Tatsukawa et al.
2004/0156211 A1 * 8/2004 Blusseau .................... 362/545

FOREIGN PATENT DOCUMENTS

EP 1 357 334 A1 10/2003
FR 2 844 033 3/2004

OTHER PUBLICATIONS

French Search Report dated Feb. 7, 2005.

* cited by examiner

*Primary Examiner*—Sandra L O'Shea
*Assistant Examiner*—Mary Zettl
(74) *Attorney, Agent, or Firm*—Locke Lord Bissell & Liddell

(57) ABSTRACT

The invention concerns a lighting module comprising a concave reflector, and at least one light source disposed in the concavity of the reflector in order to illuminate at least upwards, and a lens situated in front of the reflector and light source. The reflector is associated with a flat plate, the top face of which is reflective in order to bend the beam coming from the reflector, the said plate comprising a front end edge able to form the cutoff in the lighting beam. The reflector is determined so as to transform a spherical wave surface coming from the source into a wave surface boiling down to an arc of a circle situated in the plane of the plate, and the lens is of revolution about an axis orthogonal to the plane of the plate and passing through the center of the said arc of a circle.

13 Claims, 4 Drawing Sheets

LIGHTING MODULE FOR A MOTOR VEHICLE AND A LIGHT COMPRISING SUCH A MODULE

FIELD OF THE INVENTION

The invention relates to a lighting module for a motor vehicle light, able to give in particular a light beam with cutoff. It concerns in particular a module of the type that comprises a concave reflector, at least one light source disposed in the concavity of the reflector in order to illuminate at least upwards, and a lens situated in front of the reflector and light source, the reflector being associated with a planar plate, in particular horizontal, the top face of which is reflective in order to bend the beam coming from the reflector, by the said plate comprising a front end edge able to form the cutoff in the light beam.

PRIOR ART

Such a lighting module is known for example from EP-A-1 357 334, which shows a reflector consisting of an elliptical mirror coupled with a lens of revolution about the optical axis. Seen from the front, the lens has a circular contour situated in a vertical plane, orthogonal to the optical axis. If it is wished to assemble several modules side by side, the circular-contour lenses will be tangent at a point with a space that is not used between the contours. It is possible to insert wedges between the circular contours, but this involves dark areas creating an unnecessary additional visible surface. In a variant, it is possible to divide or enlarge the lenses in a square or hexagon in order to assemble them by putting cut faces in contact. Working in this way, a loss of illuminating surface is created.

A headlight produced with such an assembly of modules gives the impression of a plurality of boxes. Thus not only is the connection of the light not optimum, but an observer will perceive the plurality of different light sources through the lenses, which is not satisfactory for style, especially when the light sources are numerous, in particular consisting of diodes.

DISCLOSURE OF THE INVENTION

A first aim of the invention is to provide a module which can be assembled with similar modules in a continuous manner, with a minimum of loss of light, and without it being possible to distinguish the light sources situated inside a light.

In addition, with an elliptical reflector, the lens is stigmatic. The cutoff of the lighting beam is sharp only along the optical axis of the light. This is even more sensitive with a module whose light source consists of a light emitting diode, such a module having a weak focus; the cutoff of the lighting beam is fuzzy on the edges. With a very broad lighting beam, there is no sharp cutoff over the entire width. Another aim of the invention is to improve the sharpness of the cutoff across the width of the beam.

The invention therefore aims above all to provide a lighting module of the type defined above that no longer has, or has to a lesser degree, the drawbacks mentioned above. The invention aims in particular to produce a lighting beam in three dimensions, with a minimum of distortions in particular in a barrel.

According to the invention, a lighting module for a motor vehicle light, of the type defined previously, is characterized in that the reflector is determined so as to transform a spherical wave surface coming from the source into a wave surface boiling down to an arc of a circle situated in the plane of the plate, and in that the lens is of revolution about an axis substantially orthogonal to the plane of the plate and passing through the centre of the said arc of the circle.

The reflector and lens according to the invention are designed so that the reflector provides the horizontal distribution of the beam whilst the lens provides the cutoff of the beam and the vertical distribution without interfering with the horizontal distribution established by the reflector.

The reflector is determined by the choice of the radius of the arc of a circle, the distance from the source to the centre of the arc of a circle and the distance from the source to the top of the reflector in the plane of the arc of a circle.

The plane of the plate preferably passes substantially through the centre of the source, which is advantageously substantially a point.

According to another definition, the surface of the reflector is such that light rays issuing from the source and falling at points situated on a curve formed by the intersection of the surface of the reflector and a vertical plane passing through the centre of the arc of a circle but separated from the source, are reflected by the surface of the reflector in this vertical plane so as to converge at a point formed by the intersection of the said vertical plane and the arc of a circle.

The reflective plate or "bender" preferably consists of a part of a disc having the arc of a circle as its edge.

The invention also concerns a light formed by an assembly of several modules as defined above.

BRIEF DESCRIPTION OF THE DRAWINGS

The invention consists, apart from the provisions disclosed above, of a certain number of other provisions which will be dealt with more explicitly below with regard to example embodiments described with reference to the accompanying figures, but which are in no way limiting. In these drawings.

DETAILED DESCRIPTION OF EMBODIMENTS OF THE INVENTION

Figure 1:
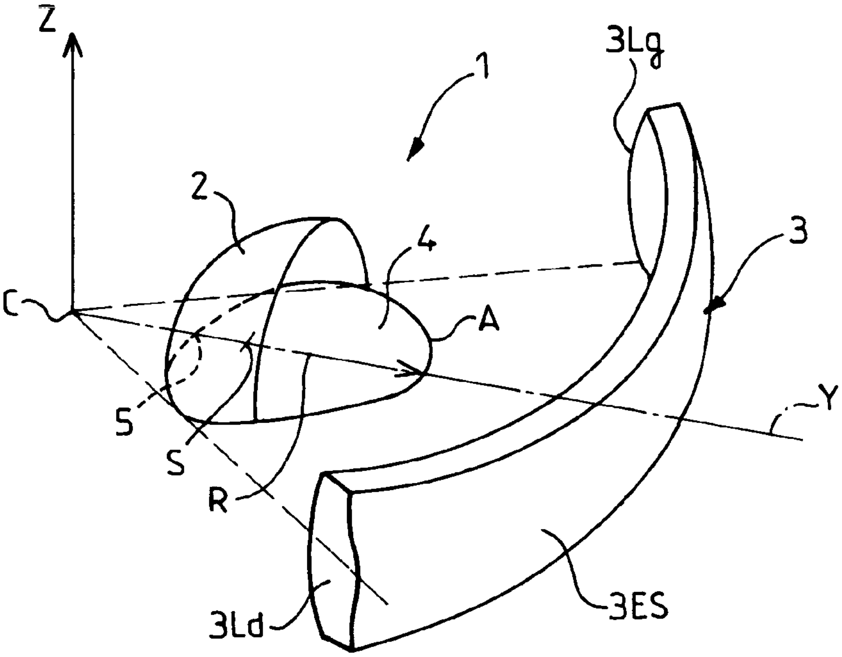
FIG. 1 is a simplified schematic view in perspective of a module according to the invention.

Referring to FIG. 1, it is possible to see, depicted schematically, a lighting module 1 for a motor vehicle light, able to give a light beam with cutoff. This module 1 comprises a concave reflector 2, at least one light source S disposed in the concavity of the reflector in order to illuminate at least upwards, and a lens 3 situated in front of the light source S and reflector 2, in the direction of propagation of the light beam.

The reflector 2 is associated with a flat plate 4, in particular horizontal, as depicted in FIG. 1. The plane of this plate 4 preferably, but not necessarily, passes substantially through the centre of the light source S. The reflector 2 is situated above the plate 4 and the top face of the plate 4 is reflective in order to bend the beam of rays coming from the reflector 2, as explained in particular in EP-A-1 357 334. The reflective plate 4 is frequently referred to as "bender" and comprises a front end edge able to form the cutoff in the lighting beam. When the plate 4 is horizontal, the cutoff is horizontal and the zone illuminated by the beam coming from the light 1 is situated below a horizontal line. By inclining the plane of the plate 4, or part of this plate, with respect to the horizontal plane it is possible to incline the cutoff line with respect to a horizontal direction by inclining the lens by the same angle.

The light source S is advantageously substantially at one point, in particular formed by a light emitting diode, enveloped by a hemispherical globe or capsule, this diode having a light-diffusion axis substantially orthogonal to the flat plate 4, and illuminating upwards.

According to the invention, the reflector is determined so as to transform a spherical wave surface, coming from the source, into a wave surface boiling down to an arc of a circle A situated on the plane of the plate 4, and the lens 3 is of revolution about an axis Z orthogonal to the plane of the plate 4 and passing through the centre C of the arc of a circle A.

A suitable reflector 2, satisfying the conditions set out previously, is unique for a given choice of the radius R of the arc of a circle A, the distance from the source S to the centre C of the arc of circle A, and the distance f from S to the top 5 of the reflector in the plane of the arc of a circle A. The top 5 of the reflector corresponds to the point of intersection of the optical axis Y-Y of the module with the reflector, the said optical axis being merged with the straight line passing through C and S.

Figure 2:
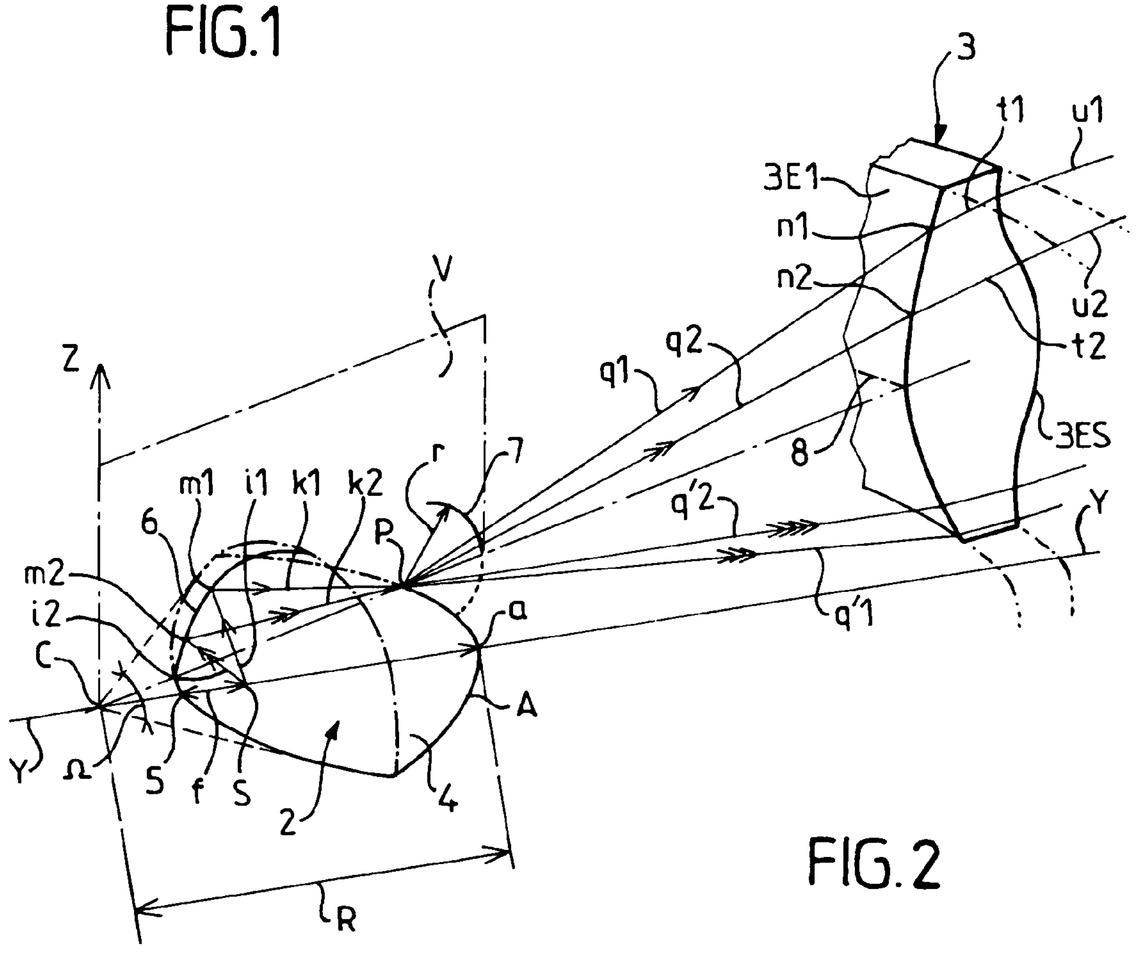
FIG. 2 is a diagram in perspective, at another angle, with cut or cut-away parts, and to a larger scale, of the module according to the invention, with the representation of paths of light rays.

The spherical wave surface coming from the source can be reduced to a point S as illustrated in FIG. 2.

The characteristics of the reflector 2 are disclosed with reference to FIG. 2, in which the reflector 2 has been depicted only partially. A vertical plane V passing through the point C and the axis Z but separated from the source S, which is then outside the plane V, is considered The intersection of the reflector 2 by the plane V consists of a partially depicted curve 6. Two points m1 and m2 on this curve 6 constitute any running points on the surface of the reflector 2.

Two light rays i1, i2 coming from the source S and falling respectively at m1 and m2 against the reflective internal surface of the reflector 2 are considered. The rays i1 and i2 are not situated in the plane V since S is outside this plane.

With the reflector 2 as defined above, the incident rays i1 and i2 are reflected along the radii k1 and k2 which are both situated in the vertical plane V. In addition, the reflected rays k1 and k2 converge at a point P formed by the intersection of the vertical plane V and the arc of a circle A.

These properties are preserved whatever the point m in question on the curve 6 and whatever the angular orientation of a vertical plane V passing through CZ.

Each point P on the arc A will behave like a new light source giving rise to a wave surface whose cutting by the plane V is a circle 7 of radius r which increases proportionally to time.

The optical path from the source S as far as the point P passing through the running point m1 or m2 on the curve 6 is constant:

$$Sm1+m1P=Sm2+m2P=\text{constant}$$

The lens 3 constitutes a volume of revolution about the vertical axis Z. The intersection of the plane of the arc of a circle A with the entry surface 3*e*1 of the lens 3 is formed by a portion of circumference 8 with the same centre C as the arc A but whose radius is greater than R.

The light rays k1, k2 sent back by the reflector 2 fall at P at the edge of the reflective plate 4 or "bender", and are therefore returned in directions q1, q2 whilst remaining in the vertical incidence plane V. The radii q1, q2 fall at n1, n2 on the entry surface 3E1 of the lens. The normals to the surface 3E1 at the points n1, n2 are situated in the vertical plane V that contains the light rays q1, q2. The refracted rays t1, t2, in the lens, remain in the same plane V, as well as the rays u1, u2 which leave by the exit face 3ES of the lens.

Figure 3:
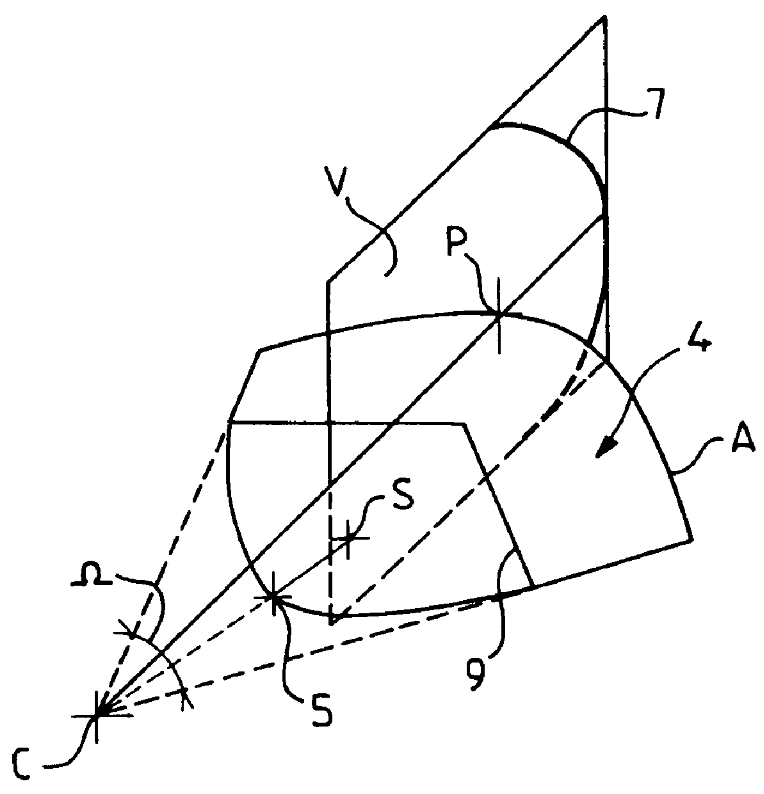
FIG. 3 is a simplified perspective diagram, to a different scale, illustrating principally the bender.

The reflective plate 4 or "bender" is formed by part of a disc having the arc of a circumference A as its edge. This reflective plate extends below the concave mirror forming the reflector 2. The limit 9 (FIG. 3) towards the source S depends only on practical considerations of passage of the light issuing from the source S. This limit 9 is formed, for example, by the two sides of an angle whose concavity is turned towards the centre C, this angle generally having as its bisector plane the vertical plane passing through the optical axis CS.

The light source S preferably consists of a light emitting diode emitting upwards, in the top hemisphere.

In reality, the source S is not perfect at one point and light rays (not shown between the source S and in the vicinity of P) will be shifted beyond the edge A and continue their path straight on at q'1, q'2 without being bent by the plate 4, which they do not encounter.

Figure 4:
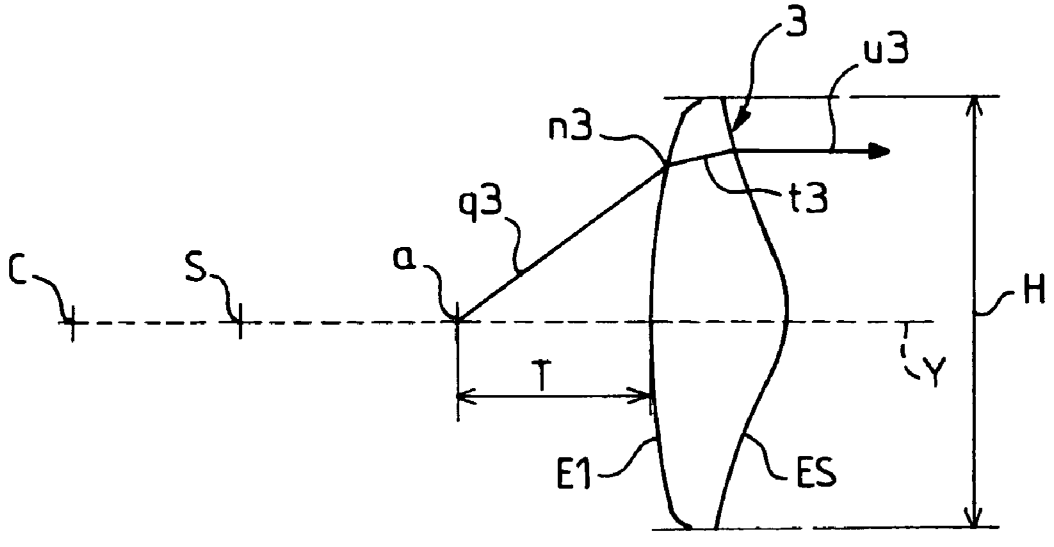
FIG. 4 is a vertical schematic section passing through the optical axis illustrating the transverse section of the lens.

FIG. 4 is a cross section of the lens 3 through a plane passing through the vertical axis Z and through the optical axis CS that cuts the arc of a circle A at the point a.

The curve E1 of the entry face of the lens in the cross-section plane of FIG. 4 has an influence on the sharpness of the cutoff. This curve E1 is chosen so that the cutoff of the lighting beam is made sharp and the best possible even for a broad beam. This curve E1 is advantageously formed by a portion of the circumference whose centre is situated on the straight line joining the source S and the centre C; this portion of circumference E1 turns its convexity towards the inside, that is to say towards the centre C as illustrated in FIG. 4. The ends of the curve E1 can be curved in a more pronounced manner. The cross section of the lens is limited towards the outside by a curve ES substantially in the shape of a paper hat, that is to say having a central rounded protrusion, the convexity of which is turned towards the outside, which is extended on each side by an inflected area becoming concave towards the outside.

The path of a light ray q3 issuing from the point a is depicted.

The angle Ω (FIG. 2) of the reflector 2, symmetrical with respect to the vertical plane passing through the optical axis CS, has a maximum value determined by the angle formed between the straight lines joining the point C to the intersections of the arc of a circle A with the reflector 2 in the plane of the plate 4.

The width of the light beam emerging from the module depends mainly on this angle Ω but also other parameters, in particular the source-apex distance, because of the influence on the size of the images.

When the radius R of the arc of a circle A tends towards infinity, the lens 3 tends towards a cylindrical lens and the beam (all other things being equal) tends towards the most intense spot permitted by the luminance of the source and the apparent surface. This is then equivalent optically to the combination of an ellipsoid and an infinite-point stigmatic lens, but with lower aberrations in the field according to the invention.

The particular example of a portion of a given circumference for the curve E1 is not limiting. E1 may be any curve.

The curve ES of the exit face is constructed so that in the plane in question (the plane passing through the axis of revolution CZ), the lens 3 is stigmatic between the point a and infinity; in other words a divergent beam of light rays issuing from the point a becomes, at the exit from the curve ES, a beam parallel to the optical axis CS.

The distance between the point a and the vertex of the curve E1 of the optical axis CS is a parameter; this distance is referred to as the draw T of the lens. For a given reflector 2, the height H of the lens depends on this on the assumption that the lens is constructed so as to recover all the possible light flux.

According to the example and embodiment in FIGS. 1 to 4, the centre C of the arc of a circle A is situated at the rear of the source S in the direction of propagation of the light beam issuing from the module; in this case, the curvature of the edge of the bender 4, formed by the arc of the circle A, turns its complexity towards the front in the direction of propagation of the light beam.

If the centre C1 (FIG. 8) of the arc of the circle A1 is situated beyond the light source S1 in the direction of propagation of the beam, the curvature of the edge A1 of the bender changes sign and turns its concavity forwards. All the explanations supplied previously remain true.

The end faces 3Ld, 3Lg (FIG. 1) of the lens 3 are planar and situated in the end planes passing through CZ, with an angle Ω.

It is possible to assemble several modules, without edge or step, placing the right-hand or left-hand end face of the lens of a module against a left-hand or right-hand end face of another module.

Figure 5:
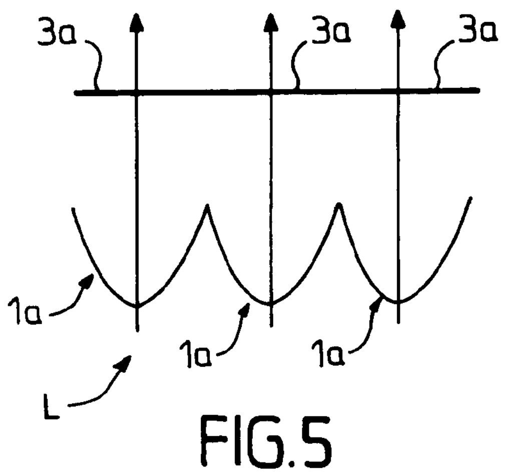
FIG. 5 is a schematic plan view of a light with three juxtaposed modules with parallel optical axes.

FIG. 5 illustrates the production of a light L by assembling identical modules 1*a*, side by side, for example three modules, for which the radius R is infinite so that the arc of a circle becomes a straight segment. The lenses 3*a* of each module are in line with one another in order to form a kind of rectilinear bar orthogonal to the parallel optical axis represented by arrows.

Figure 6:
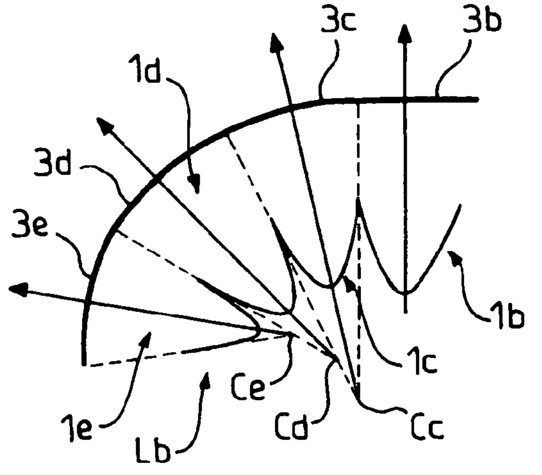
FIG. 6 is a schematic plan view of a light with four juxtaposed modules with optical axes with progressive inclination.

FIG. 6 is a diagram of a light Lb obtained by assembling several modules, in particular 4, having a positive radius R (FIGS. 1 to 4) but whose value decreases in one direction, from right to left in FIG. 6.

The first module 1*b* has an infinite radius R; the following module 1*c* has a smaller radius R and the centre Cc of the module is situated on a limit (left in the example) of the module 1*b*, and so on: the following module 1*d* has a radius R less than that of the module 1*c* and the centre Cd of the module 1*d* is situated on the left-hand angular limit of the module 1*c*. Finally, the end module 1*e* has the smallest radius R and its centre Ce is situated on the left-hand angular limit of the module 1*d*. The optical axes of the successive modules, represented by arrows have a progressive inclination with respect to the optical axis of the first module 1*b*.

The surface formed by the assembly of the lenses 3*b*, 3*c*, 3*d*, 3*e* is continuous and derivable.

The light Lb of FIG. 6 can constitute a DBL ("Dynamic Bending Light") with a successive illumination of the light sources of the modules 1*b* . . . 1*e* in order to follow a bend.

Figure 7:
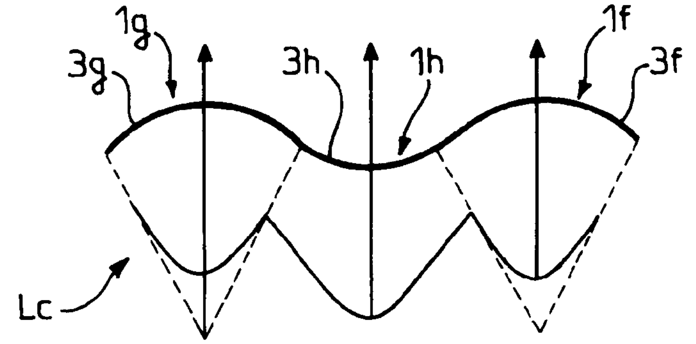
FIG. 7 is a schematic plan view of a light with three juxtaposed modules with parallel optical axes, in which the lens of the central module has a curvature in the opposite direction to that of the lateral lenses.

FIG. 7 shows another type of light Lc obtained by assembling three modules 1*f*, 1*g*, 1*h*. The two side modules 1*f*, 1*g* have a positive radius of curvature within the meaning of the example embodiment in FIGS. 1 to 4, whilst the module of the middle 1*h* has a negative radius R which gives rise to an inverse curvature of the lens 3*h*. The curve formed by the assembly of the lenses then has an undulating shape. The optical axes of the three modules of FIG. 7 are parallel, still depicted by arrows.

Figure 8:
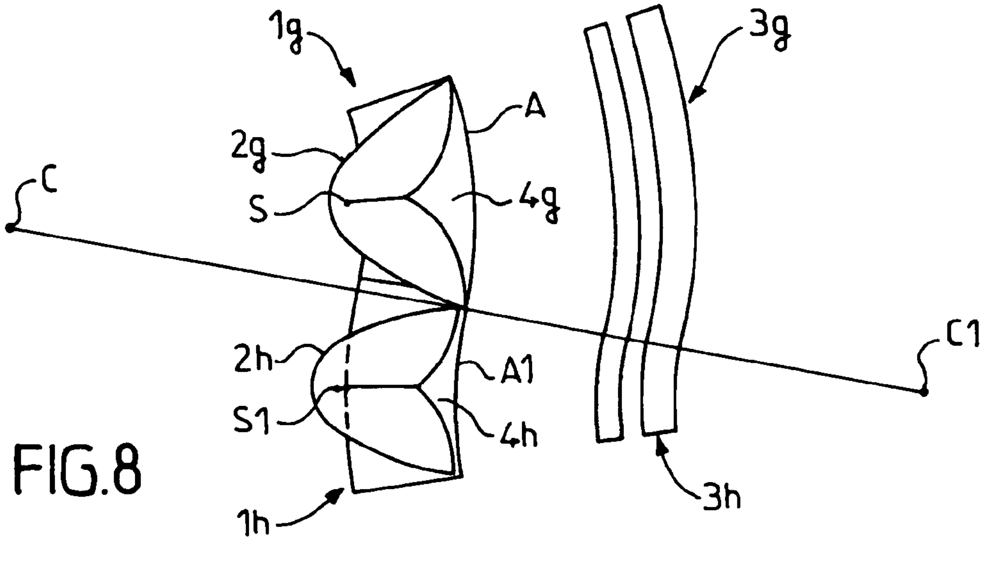
FIG. 8 is a diagram in plan view of two juxtaposed modules with curvature in opposite directions.

FIG. 8 is a schematic plan view of a light comprising at least one assembly of two juxtaposed modules 1*g* to 1*h*. The module 1*g* has a positive radius of curvature and the other 1*h* has a negative radius of curvature with an inverse curvature of the lens 3*h*. The reflectors 2*g*, 2*h* and the benders 4*g*, 4*h* have been shown diagrammatically. The arc of a circle A for the module 1*g* has its centre at C on the left in the figure, whilst the concave arc of a circle A1 has its centre at C1 on the right in FIG. 8. The assembly in FIG. 8 constitutes a basic pattern which can be repeated several times by juxtaposition.

The lens 3*h*, which is concave on its exit face, provides the spot, that is to say the concentrated zone of the light beam, whilst the lens 3*g*, convex towards the front, provides the lateral spread like the lens 3*f* in FIG. 7.

The lighting modules according to the invention therefore offer possibilities of complex associations favourable to the creation of original style effects, and to the installation of a plurality of modules.

When an observer looks at a module or light according to the invention he does not distinguish the juxtaposed modules or the light sources, in particular the light emitting diodes situated inside the modules. The observer therefore has the impression of a single assembly.

Figure 9:
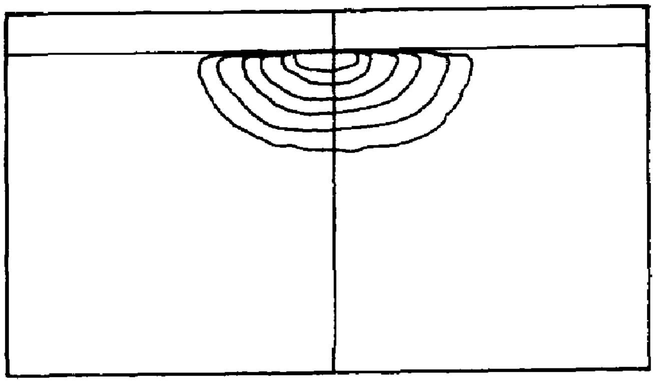
FIG. 9 shows a network of isolux curves obtained with a module according to the invention, where the radius of the arc of a circle is infinite.

FIG. 9 shows a network of isolux curves obtained on a screen at a given distance from a module according to the invention having a infinite radius R. It is clear that the curves are all situated below a particularly sharp horizontal cut-off line.

Figure 10:
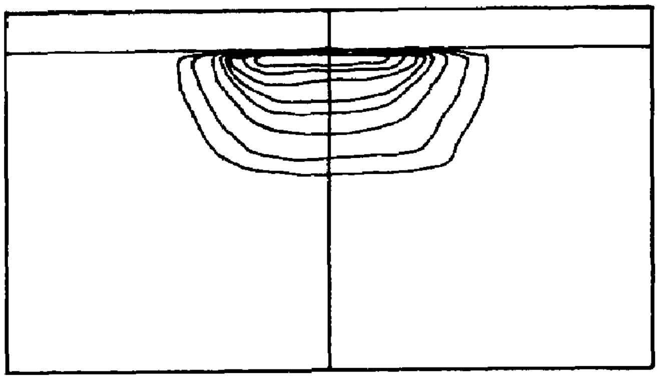
FIG. 10 shows a network of isolux curves obtained with a convex module according to the invention.

FIG. 10 corresponds to a convex lighting module like the one in FIGS. 1 to 4 or like the modules 1*f*, 1*g* in FIG. 7. The cutoff is also sharp with all the curves below a horizontal line; the light flux is a little more spread downwards on each side of the vertical mid-plane.

Figure 11:
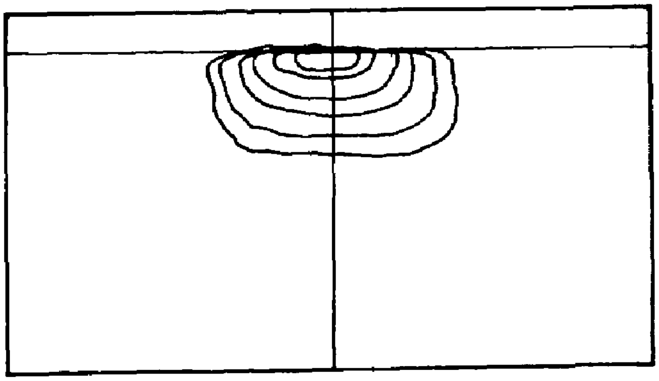
FIG. 11 shows a network of isolux curves obtained with a concave module according to the invention.

FIG. 11 illustrates the isolux curves obtained with a module with a negative radius R, such as the module 1*h* in FIG. 7 and FIG. 8. The sharpness of the cutoff is preserved. The isoluxes are a little less spread angularly than in FIG. 10.

In order to check whether a lighting module is in accordance with the invention, it suffices to place a point source at the point S, this point source being able to be formed by a laser point or by a diode with a very small size. Because it is a case of a check, it is not necessary to use a power source of greater dimensions. By placing a sheet of paper on (or instead of) the reflective plate 4, a luminous arc of a circle corresponding to the arc A must be seen to appear on the sheet of paper.

For a check concerning the lens 3, a vertical shaft of light that converges at a is produced. It is then necessary to obtain a vertical light segment on the other side of the lens.

An equation of the surface of the reflector 2 is given below in spherical coordinates.

f is the distance from the source S to the top 5 of the reflector (pseudo-focal). The origin of the reference frame is placed at S, the y axis is CS, and the x axis is situated in the plane of the plate 4 and is orthogonal to the y axis. The z axis is orthogonal to the plane of the plate 4 and passes through the point S.

The coordinates of the centre C, in the reference frame, are, along the x, y and z axes: Cx, Cy and 0.

The running point m of the surface 2 of the reflector is situated on a direction defined by a longitude θ and a latitude ϕ. The absolute value of the vector radius of the point m is designated by μ.

In the following calculations, α, β and χ are intermediate variables.

$$\vec{v} = \begin{bmatrix} v_x \\ v_y \\ v_z \end{bmatrix} = \begin{bmatrix} \sin\varphi\cdot\sin\theta \\ \sin\varphi\cdot\cos\theta \\ \cos\varphi \end{bmatrix}, \begin{bmatrix} C_x \\ C_y \\ 0 \end{bmatrix} = C \text{ and } K = C_y + R + 2f,$$

is put,

ϕ and θ are the variables of the parametric equation of the surface.

Let:

$$\alpha=4\{(K-v_yC_y)^2-R^2(v_y^2+v_x^2)\}$$

$$\beta=-4\{(K^2-R^2-C_y^2)(K-v_yC_y)-2R^2v_yC_y\}$$

$$\chi=(K^2-R^2-C_y^2)^2-4R^2C_y^2$$

$$\mu = \frac{-\beta + \sqrt{\beta^2 - 4\alpha\chi}}{2\alpha}$$

Then $M=S+\mu\cdot\vec{v}$ belong to the surface of the reflector sought.

The equation of the curve ES of the exit face of the lens is given, when the entry face has as the curve E1 a circle convex towards the inside.

The following is put:

T=d(a,EI), the draw of the lens $C_{fe}$, the radius of the entry face $ep_0$, of the thickness at the centre of the lens n, the refractive index of the material η and α are the variables of the parametric equation of the surface.

Let:

$$h=C_{fe}\sin\eta$$

$$d=\sqrt{h^2+(T+C_{fe}(1-\cos\eta))^2}$$

$$\omega = \arcsin\frac{h}{d}$$

$$\sigma = \arcsin\left(\frac{\sin(\eta+\omega)}{n}\right)-\eta$$

$$l = \frac{T + ep_0(n-1) - d + C_{fe}(1-\cos\eta)}{n - \cos\sigma}$$

$$\rho=R+d\cdot\cos\omega+l\cdot\cos\sigma$$

Then $$\begin{bmatrix} \rho\cdot\sin\alpha \\ C_y+\rho\cdot\cos\alpha \\ h+l\cdot\sin\sigma \end{bmatrix}$$

belong to the exit surface of the lens.

The invention claimed is:

1. A lighting module for a motor vehicle light, giving along an optical axis a light beam with horizontal cutoff, comprising:

a concave reflector;

at least one light source disposed in the concavity of the reflector in order to illuminate at least upwards; and a lens having a light entry face and a light exit face which are not parallel, the lens being situated at a front of the reflector and the light source, the light entry face facing the reflector and the light source, the reflector being associated with a flat plate comprising a top face that is reflective in order to bend the beam coming from the reflector, and a front end edge forming a cutoff in the light beam, wherein the reflector is determined so as to transform a spherical wave surface coming from the at least one light source into a wave surface boiling down to an arc of a circle situated in a plane of the flat plate, wherein the light entry face and the light exit face are each of revolution about an axis substantially orthogonal to the plane of the plate and orthogonal to the optical axis and passing through a centre of the arc of the circle, and wherein a divergent beam of light rays issuing from a point on the arc of the circle, the point lying in a plane containing the axis of revolution, becomes a beam parallel to the projection of the optical axis on said plane upon passing through the light exit face.

2. The lighting module according to claim 1, wherein the surface of the reflector is such that the light rays issuing from the source and falling at points situated on a curve formed by the intersection of the surface of the reflector and a vertical plane passing through the centre of the arc of a circle, but separated from the source, are reflected by the surface of the reflector in this vertical so as to converge at a point formed by the intersection of the vertical plane and the arc of a circle.

3. The lighting module according to claim 1, wherein the reflector provides the horizontal position of the beam whilst the lens provides vertical distribution without interfering with a horizontal distribution established by the reflector.

4. The lighting module according to claim 1, wherein the reflector is determined by a radius of the arc of the circle, a distance from the source to the centre of the arc of the circle, and a distance from the source to a top of the reflector in a plane of the arc of the circle.

5. The lighting module according to claim 1, wherein the plane of the plate passes substantially through a centre of the source.

6. The lighting module according to claim 1, wherein the light source consists of a light-emitting diode.

7. A motor vehicle light, formed from an assembly of several lighting modules according to claim 1, placing a right-hand or left-hand end face of the lens of each module against a left-hand or right-hand end face of the lens of another module.

8. The motor vehicle light according to claim 7, wherein the light is obtained by a side-by-side assembly of identical modules for which the radius is infinite, the lenses of the modules being in line with one another in order to form a rectilinear bar orthogonal to a parallel optical axis.

9. The motor vehicle light according to claim 7, wherein the light is obtained by assembling modules having a positive radius that decreases in one direction.

10. The motor vehicle light according to claim 9, wherein a first module has an infinite radius, a following module has a smaller radius, a centre of said following module being situated on a limit of the first module and so on, an optical axes of successive modules having a progressive inclination with respect to an optical axes of the first module, the surface formed by an assembly of the lenses being continuous.

11. The motor vehicle light according to claim 10, constituting a DBL ("Dynamic Bending Light") with a successive illumination of the light sources of the modules in order to follow a bend.

12. The motor vehicle light according to claim 7, wherein the light comprises at least one assembly of at least two modules, one of the modules having a positive radius of curvature while another of the modules has a negative radius.

13. A lighting module for a motor vehicle light, giving along an optical axis a light beam with horizontal cutoff, comprising:

a concave reflector;

at least one light source disposed in the concavity of the reflector in order to illuminate at least upwards; and a lens having a light entry face and a light exit face which are not parallel, the lens being situated at a front of the reflector and the light source, the light entry face facing the reflector and the light source, the reflector being associated with a flat plate comprising a top face that is reflective in order to bend the beam coming from the reflector, and a front end edge forming a cutoff in the light beam, wherein the reflector is determined so as to transform a spherical wave surface coming from the at least one light source into a wave surface boiling down to an arc of a circle situated in a plane of the flat plate, wherein the light entry face and the light exit face are each of revolution about an axis substantially orthogonal to the plane of the plate and orthogonal to the optical axis and passing through a centre of the arc of the circle, wherein the flat plate is formed by part of a disc having an arc of a circle as a front edge, and wherein a divergent beam of light rays issuing from a point on the arc of the circle, the point lying in a plane containing the axis of revolution, becomes a beam parallel to the projection of the optical axis on said plane upon passing through the light exit face.

* * * * *